(12) United States Patent
Shmilovich et al.

(10) Patent No.: US 11,180,242 B2
(45) Date of Patent: Nov. 23, 2021

(54) FLOW CONTROL SYSTEMS HAVING MOVABLE SLOTTED PLATES

(71) Applicant: The Boeing Company, Chicago, IL (US)

(72) Inventors: Arvin Shmilovich, Huntington Beach, CA (US); Rene Woszidlo, St. Charles, MO (US); Abraham N. Gissen, Centennial, CO (US)

(73) Assignee: The Boeing Company, Chicago, IL (US)

(*) Notice: Subject to any disclaimer, the term of this patent is extended or adjusted under 35 U.S.C. 154(b) by 252 days.

(21) Appl. No.: 16/443,040

(22) Filed: Jun. 17, 2019

(65) Prior Publication Data

US 2020/0391853 A1 Dec. 17, 2020

(51) Int. Cl.
*B64C 21/08* (2006.01)

(52) U.S. Cl.
CPC .......... *B64C 21/08* (2013.01); *B64C 2230/06* (2013.01)

(58) Field of Classification Search
CPC . B64C 2230/20; B64C 2230/06; B64C 21/02; B64C 21/04; B64C 21/08
See application file for complete search history.

(56) References Cited

U.S. PATENT DOCUMENTS

| 3,232,563 | A | * | 2/1966 | Langfelder | B64C 9/32 244/213 |
|---|---|---|---|---|---|
| 2011/0108672 | A1 | * | 5/2011 | Shmilovich | B64C 9/38 244/207 |
| 2012/0256049 | A1 | * | 10/2012 | Shmilovich | B64C 21/08 244/1 N |
| 2019/0136881 | A1 | * | 5/2019 | Amitay | B64C 21/04 |

* cited by examiner

*Primary Examiner* — Richard R. Green
*Assistant Examiner* — William L Gmoser
(74) *Attorney, Agent, or Firm* — Hanley, Flight & Zimmerman, LLC

(57) ABSTRACT

Flow control systems having movable slotted plates are disclosed. A disclosed example apparatus includes a flow control plate to be placed proximate an opening of an aerodynamic body. The opening has a first slot and the flow control plate has a second slot angled relative to the opening. The apparatus also includes an actuator to move the flow control plate relative to the opening in a linear oscillatory motion to vary a flow of fluid exiting the opening over the aerodynamic body. The flow of fluid is to flow from the second slot to the first slot.

21 Claims, 8 Drawing Sheets

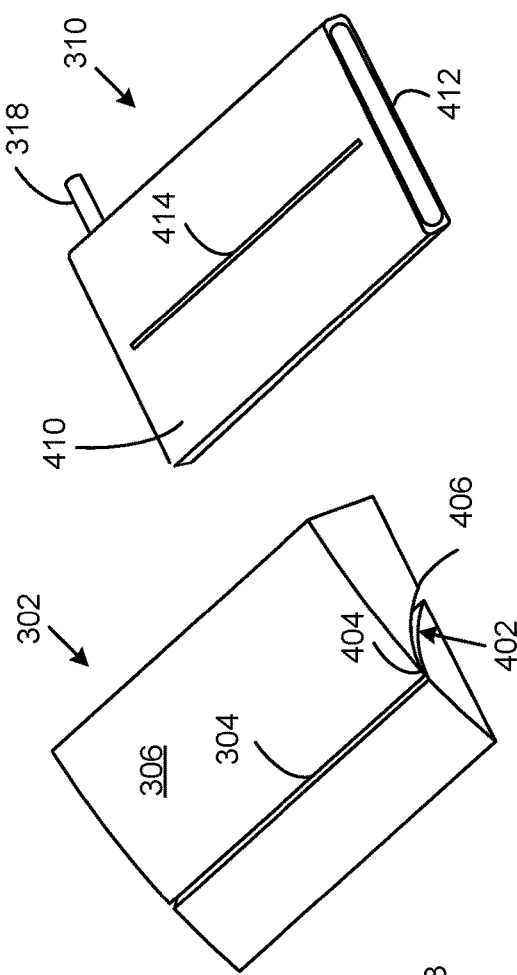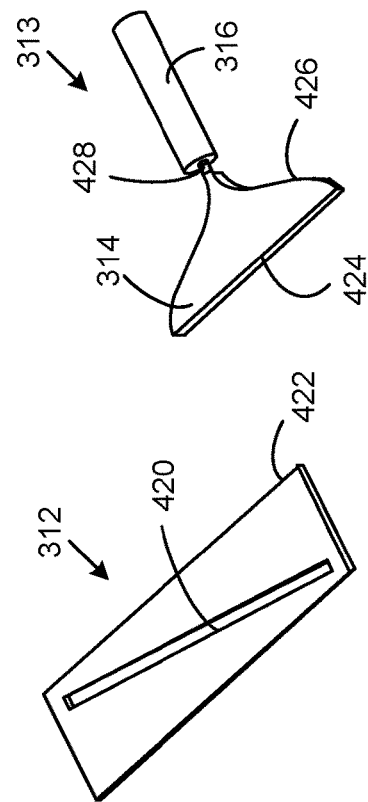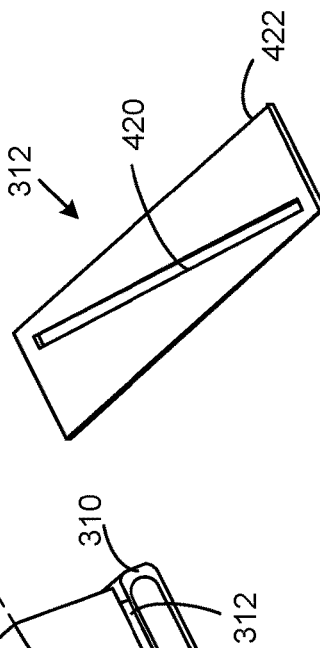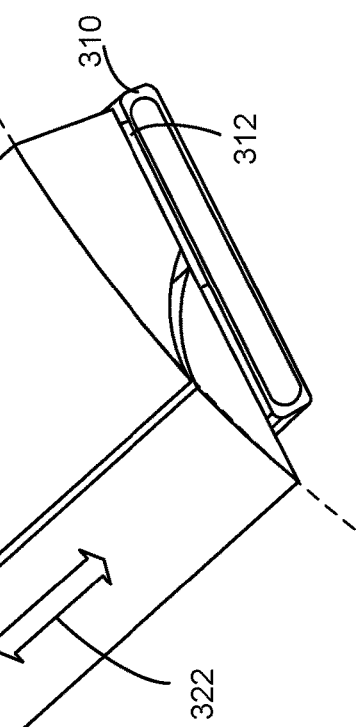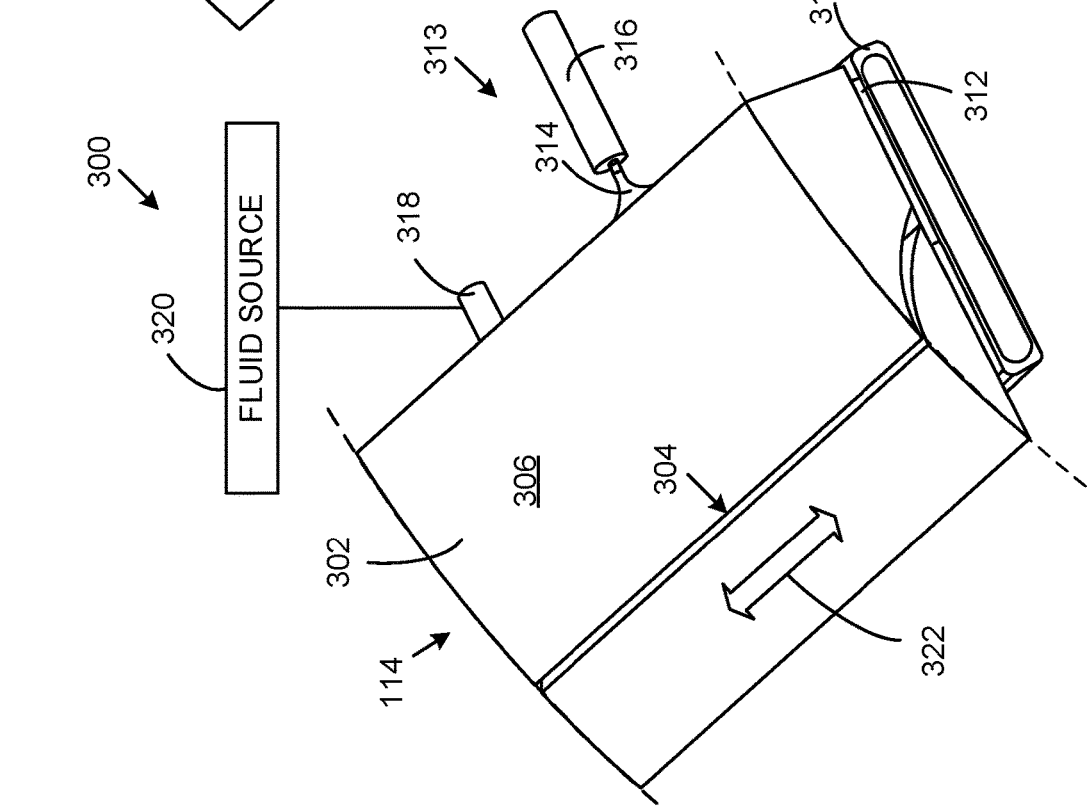

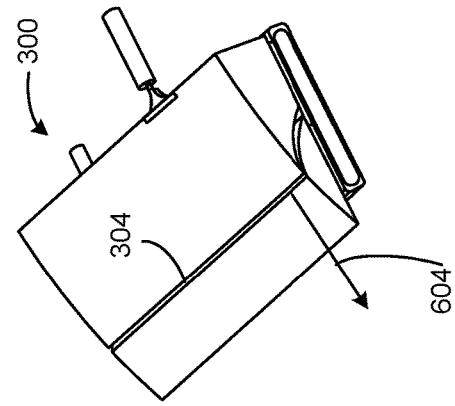
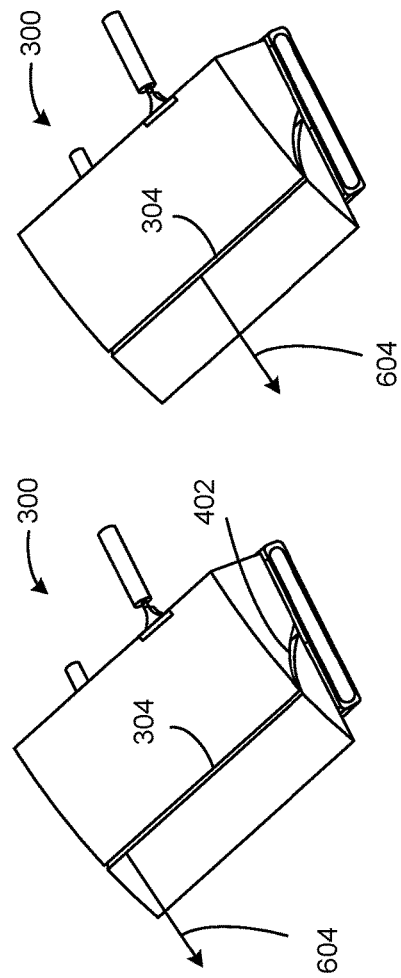
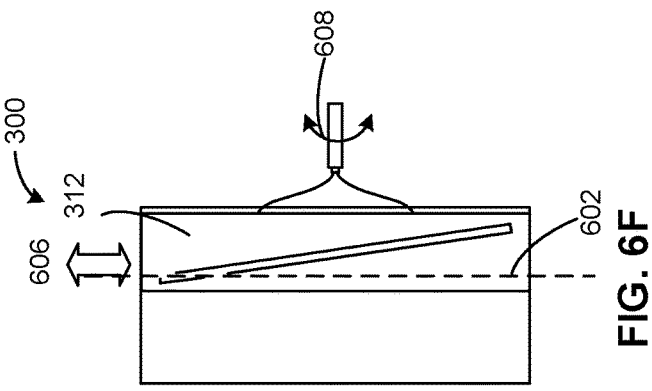
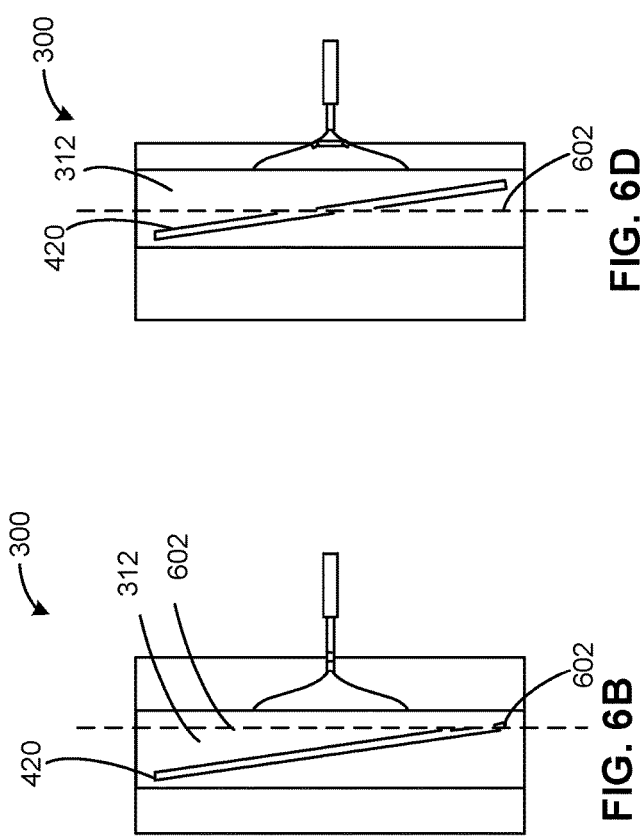

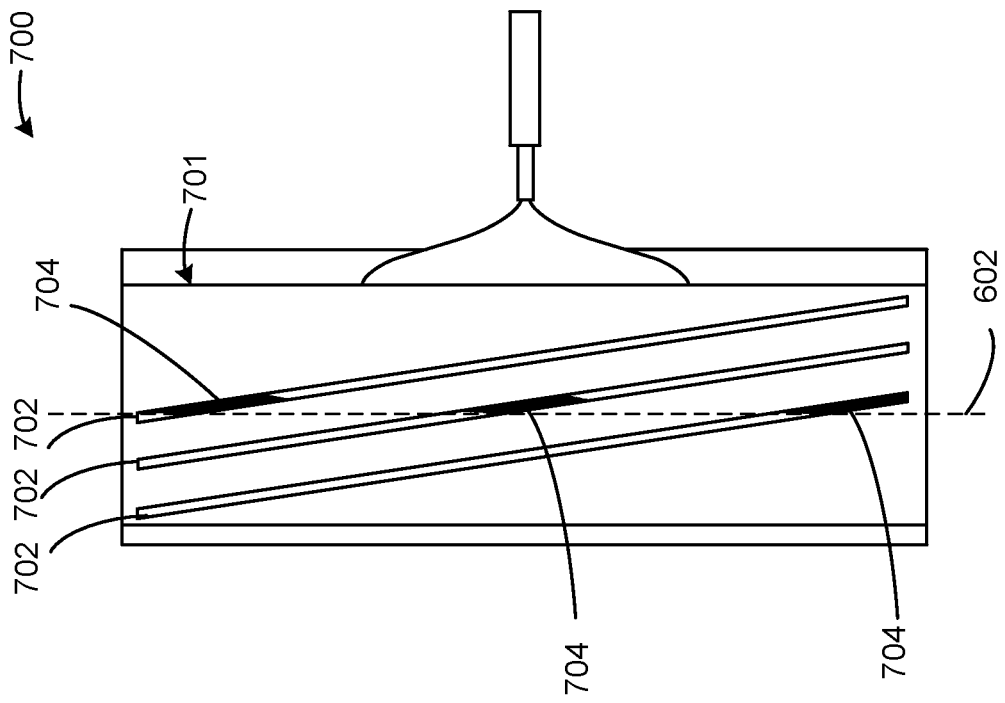
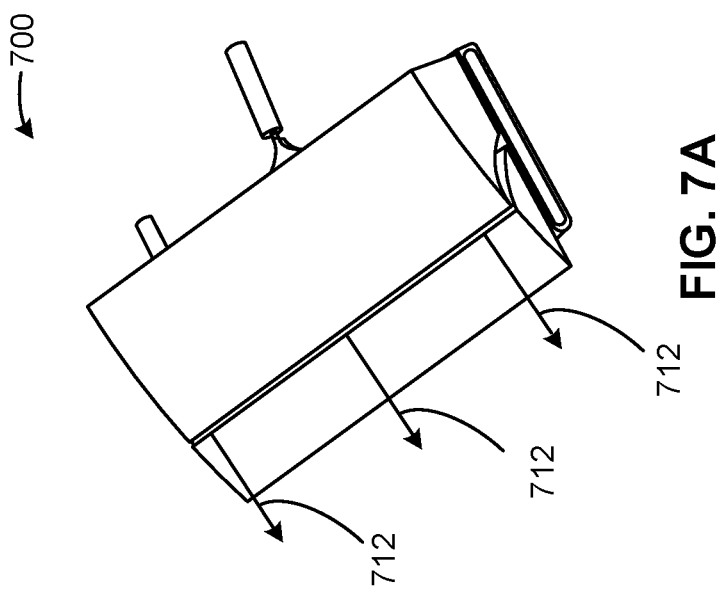

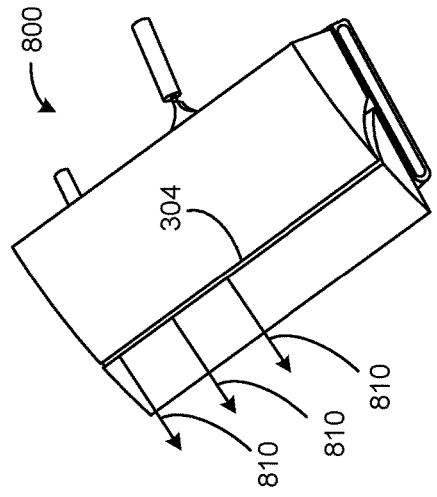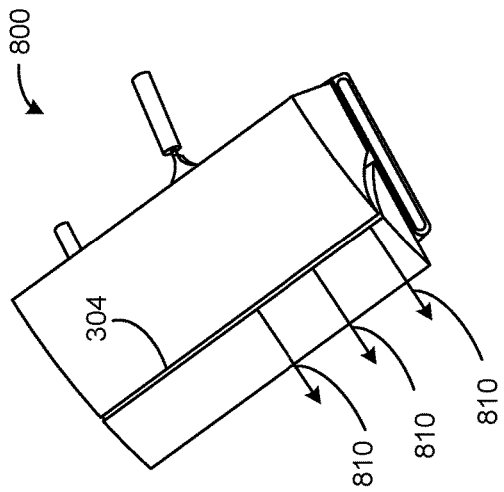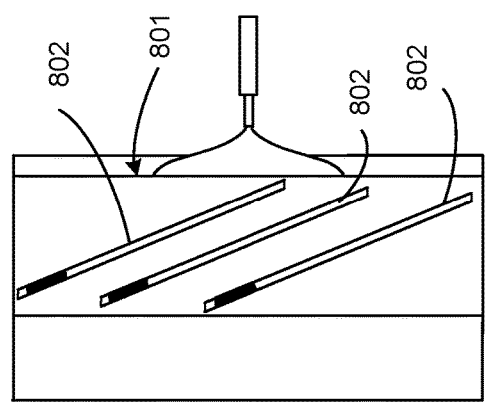

FLOW CONTROL SYSTEMS HAVING MOVABLE SLOTTED PLATES

FIELD OF THE DISCLOSURE

This disclosure relates generally to aircraft and, more particularly, to flow control systems having movable slotted plates.

BACKGROUND

Aircraft employ movable control surfaces to affect the aerodynamic lift of the aircraft. Control surfaces may include, for example, flaps, slats, ailerons, etc. When a control surface, such as a flap, is deployed, the airflow over the top of the wing can separate from the airflow along the bottom of the wing and reattach downstream of the wing. However, the airflow over the top of the wing does not follow the entire upper surface of the wing and control surface. Instead, the airflow detaches or separates from the upper surface of the wing, thereby producing drag and decreasing lift of the wing.

Under such conditions, flow control can be used to enhance lift performance of an aircraft by using a fluidic source (e.g., bleed air from an engine or a special purpose compressor). For example, air extracted from the fluidic source is ejected from across a top surface of the wings or flaps along a generally streamwise direction. These ejected air streams imparts momentum into the flow. The momentum causes the flow to better follow the surface of the wing and the flap. As a result of this streamlining effect, the global circulation increases around the entire wing and higher lift is obtained.

However, known methods of flow control can require substantial amounts of ejected airflow for a desired effect. In particular, aircraft engines can be used to supply air for actuation by "bleeding" compressed air from inside an engine. However, design targets require a substantial amount of bleed air. This requirement of engine bleed can impact the size and efficiency of the aircraft engines. As a result, larger and heavier engines required for the design targets can lead to an increase in aircraft weight and engine cost. Further, bleed requirements reduce the efficiency of the engines. Alternatively, a separate air compressor can also be used in conjunction with a duct delivery system to supply the air for actuation. However, the addition of separate air compressors also leads to additional weight.

SUMMARY

An example apparatus includes a flow control plate to be placed proximate an opening of an aerodynamic body. The opening has a first slot and the flow control plate has a second slot angled relative to the opening. The apparatus also includes an actuator to move the flow control plate relative to the opening in a linear oscillatory motion to vary a flow of fluid exiting the opening. The flow of fluid is from the second slot to the first slot.

An example method includes providing, via a fluid source, a fluid flow to a flow control plate that is proximate an opening of an aerodynamic body. The opening includes a first slot and the flow control plate includes a second slot in fluid communication with the first slot and angled from the first slot. The example method also includes moving, via an actuator, the control plate in a linear oscillatory motion relative to the opening to vary a flow of fluid from a fluid source exiting the opening.

An example aircraft includes an aerodynamic body having an opening thereon, where the opening includes a first slot. The aircraft also includes a flow control plate positioned proximate the first slot. The flow control plate has a second slot in fluid communication with the first slot. The second slot is angled relative to the first slot. The aircraft also includes an actuator to move the flow control plate in a linear oscillatory motion to vary a flow of fluid from a fluid source exiting the first slot.

BRIEF DESCRIPTION OF THE DRAWINGS

FIG. 3 illustrates an example lift increase apparatus in accordance with teachings of this disclosure.

FIGS. 4A-4D illustrate components of the example lift increase apparatus of FIG. 3.

FIGS. 6A-6F illustrate operation of the example lift increase apparatus of FIGS. 3-5.

FIGS. 7A and 7B illustrate an alternative example lift increase apparatus that can be implemented in examples disclosed herein.

FIGS. 8A-8D illustrate another alternative example lift increase apparatus that can be implemented in examples disclosed herein.

Figure 1:
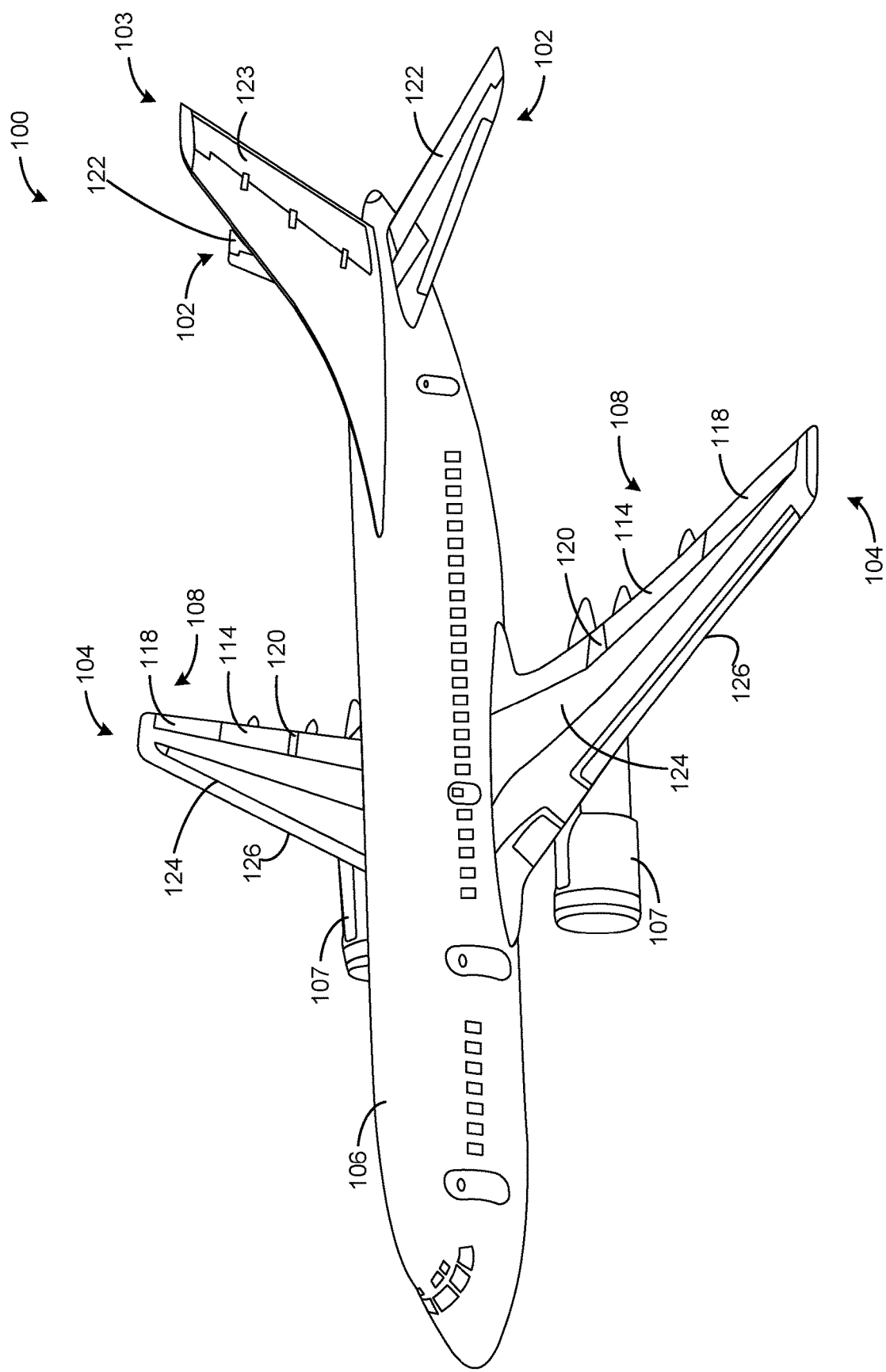
FIG. 1 illustrates an aircraft in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Flow control systems having movable slotted plates are disclosed. During flight of an aircraft, airflow over a top of a wing of the aircraft can separate from an upper surface of the wing and/or a control surface of the wing. In particular, the airflow detaches or separates from the upper surface of the wing, thereby producing drag and decreasing lift of the wing. Some known systems employ active flow control systems to reduce separation of the airflow. However, these systems can require a significant amount of airflow to operate, which can often necessitate a significant amount of weight and cost to an aircraft. Accordingly, it is desirable to have a method and system that reduces the fluidic input required for actuation to practical levels.

Examples disclosed can herein increase lift and reduce drag on a wing, thereby improving the aerodynamic performance of an aircraft and, thus, reduce fuel burn. Consequently, this results in reduced emissions and lower environmental impact. Examples disclosed herein utilize a flow control system that implements a fluid flow control plate with at least one slot proximate an external opening (e.g., an external nozzle, an external outlet, etc.) of an aerodynamic body of an aircraft, for example. In particular, a first slot of the fluid control plate extends along a direction different from a second slot of an external opening of a corresponding aerodynamic body. In other words, the first slot is angled relative to the second slot. The flow control plate is caused to move in an oscillatory motion to vary airflow exiting the external opening. The airflow may be varied in flow direction, intensity, flow width and/or geometry. Examples disclosed herein are relatively lightweight and compact, thereby saving space so that the system results in a net benefit to vehicle performance. Further, examples disclosed herein do not necessitate relatively large and heavy fluid supply systems (e.g., air pumps, engine bleed lines that require larger engines, etc.) in comparison to some known fluid control systems.

In some examples, the fluid control plate includes multiple slots. In some such examples, at least some of the slots only partially span a width of the flow control plate. In some examples, the external opening includes a curved fluid passageway, which can be implemented as a nozzle (e.g., a converging nozzle, a converging-diverging nozzle, etc.). In some examples, a plenum disposed within a cavity of the aerodynamic body provides airflow to the slot of the fluid control plate. In some examples, a linear actuator is implemented to provide the oscillatory motion of the fluid control plate. In particular, the oscillatory motion of the fluid control plate caused by the linear actuator can be along a single axis of motion, for example.

As used herein, the term "aerodynamic body" refers to a component, surface, contour, device and/or assembly that forms part of an aerodynamic structure. As used herein, the terms "slot," "slotted" and "slot-shaped" refer to an opening or passageway that exhibits a slot-like shape extending along a lengthwise (e.g., lateral) direction. Accordingly, the terms "slot," "slotted" and "slot-shaped" can refer to slots that are rounded or include sharply-defined edges, or any other appropriate geometry. As used herein, the term "angled" in the context of multiple slots (e.g., slot openings) refers to an angle between directions in which the slots extend (e.g., an angle between slot lengths). Further, the term "angled" does not refer to objects that are angled at 0 degrees from one another.

FIG. 1 illustrates an example aircraft 100 in which the examples disclosed herein can be implemented. In the illustrated example, the aircraft 100 includes horizontal tails 102, a vertical tail 103 and wings 104 attached to a fuselage 106. The wings 104 of the illustrated example have engines 107, and control surfaces (e.g., flaps, ailerons, tabs, etc.) 108, some of which are located at a trailing edge of the wings 104. The control surfaces 108 may be displaced or adjusted (e.g., deflected, etc.) to provide lift during takeoff, landing and/or flight maneuvers. In some examples, the control surfaces 108 are operated (i.e., displaced) independently of one another. The example control surfaces 108 include trailing edge flaps (e.g., rotatable flaps) 114. The control surfaces 108 of the illustrated example also include ailerons 118 and flaperons 120. In this example, the horizontal tails 102 include elevators 122 and the vertical tail 103 includes a rudder 123. The wings 104 also define upper and lower surfaces (e.g., upper and lower sides, upper and lower aerodynamic surfaces, etc.) 124, 126, respectively.

To control flight of the aircraft 100, the flaps 114 alter the lift and pitch of the aircraft 100. The control surfaces 108 of the illustrated example also play a role in controlling the speed of the aircraft 100. Any of the control surfaces 108 of the illustrated example may be independently moved (e.g., deflected) to control the load distribution in different directions over the wing 104, thereby directing movement of the aircraft 100. In some examples, during cruise of the aircraft, the control surfaces 108 are moved to reduce the drag of the aircraft 100.

Examples disclosed herein can vary a degree of lift provided to the aircraft 100, as well as reduce the drag during flight (e.g., maneuvering, cruise, landing and takeoff, etc.). Examples disclosed herein may be applied to the control surfaces 108, the tails 102, 103, the wings 104, the fuselage 106, the engines 107 and/or any other exterior or outboard structure (e.g., a horizontal stabilizer, a wing strut, an engine strut, a canard stabilizer, etc.) of the aircraft 100. Additionally or alternatively, in some examples, the fuselage 106 has control surfaces, which may be deflected, to alter the flight maneuvering characteristics during cruise and/or takeoff of the aircraft 100.

Figure 2A:
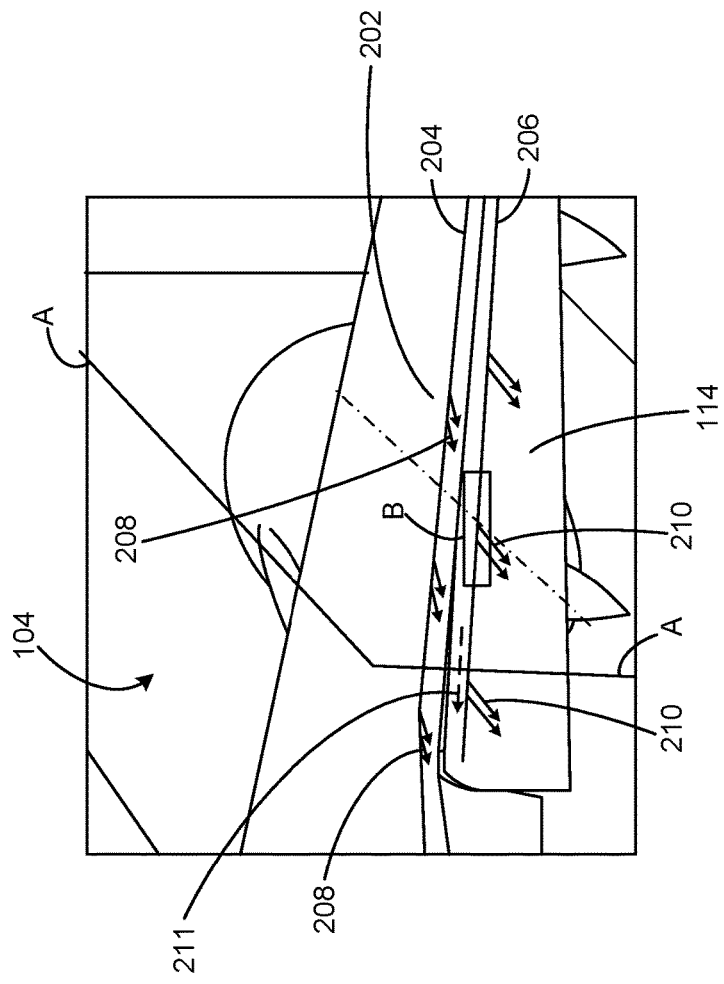
FIG. 2A illustrates a portion of a wing of the example aircraft of FIG. 1 in which examples disclosed herein can be implemented.

FIG. 2A illustrates a portion of the wing 104 of the example aircraft 100 of FIG. 1 in which examples disclosed herein can be implemented. According to the illustrated example of FIG. 2A, the wing 104 includes a wing body 202 and the flap 114. In this example, the wing body 202 includes an opening 204 and, similarly, the flap 114 includes an opening 206. The example openings 204, 206 shown in FIG. 2A are slotted and/or slot-shaped. In particular, the openings 204, 206 extend laterally along a spanwise direction of the wing 104.

To control, adjust and/or change a lift of the aircraft 100, the openings 204, 206 eject a fluid (e.g., a pressurized fluid),which is air in this example. In particular, the openings 204, 206 of the illustrated example emit respective jet effluxes 208, 210 that move (e.g., oscillate) across the aforementioned spanwise direction, as generally indicated by an arrow 211. In particular, the jet effluxes 208, 210 are swept and/or moved across the spanwise direction of the wing 104. As a result of the jet effluxes 208, 210, a separation of flow from the wing 104 is reduced (e.g., minimized), thereby reducing the drag of the aircraft 100 and, thus, leading to reduced overall fuel consumption of the aircraft 100. Further, a lift of the aircraft 100 is increased (e.g., during takeoff, climb out, cruise, maneuvering, approach and landing of the aircraft 100).

While the openings 204, 206 are shown in this example as being slotted or slot-shaped, and the openings 204, 206 generally extend along a spanwise direction of the wing 104, the openings 204, 206 can extend along any direction of the wing 104 and/or the aircraft 100. Further, examples disclosed herein can be implemented on any aerodynamic structure or body of any type of vehicle, manned or unmanned including, but not limited to, unmanned aerial vehicles, commercial and military aircraft, unmanned ground vehicles, passenger vehicles, marine vehicles, manned or unmanned military vehicles, etc.

Figure 2B:
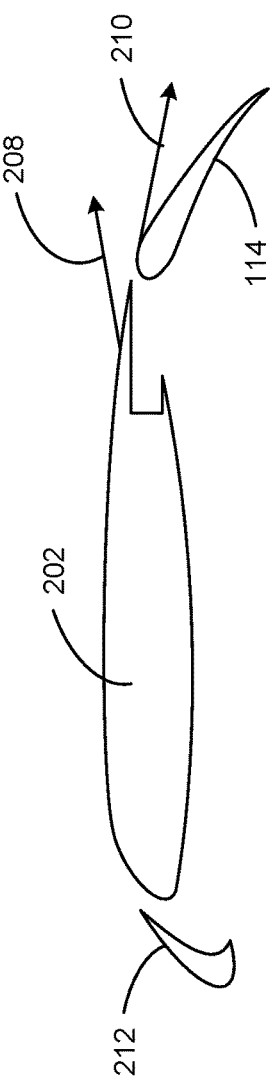
FIG. 2B is cross-sectional view of the wing of FIGS. 1 and 2A along a plane A shown in FIG. 2A.

FIG. 2B is a cross-sectional view of the wing 104 along a plane A shown in FIG. 2A. In the illustrated example, a slat is 212 is shown relative to the wing body 202, as well as the flap 114. As can be seen in the example of FIG. 2B, the jet efflux 208 is emitted from the wing body 202 while the jet efflux 210 is emitted from the flap 114. In other words, the jet effluxes 208, 210 associated with the wing 104 exit therefrom via multiple movable components of the wing 104 at different orientations (e.g., relative to a streamwise direction). Accordingly, the jet effluxes 208, 210 associated with the wing 104 can be controlled (e.g., independently controlled) even when multiple movable components of the wing 104 are being pivoted and/or angled relative (e.g., rotated relative) to one another.

FIG. 3 illustrates an example lift increase apparatus 300 in accordance with teachings of this disclosure. In particular, the example of FIG. 3 represents a portion of the flap 114, which is denoted by portion "B" shown in FIG. 2A. Thus, the lift increase apparatus 300 of the illustrated example is shown in a cutaway view and includes an aerodynamic body 302 (a portion of which is shown) having an opening (e.g., a slot, a slotted opening, a slot opening, etc.) 304 of an external surface (e.g., an exterior surface) 306. The example lift increase apparatus 300 also includes a plenum 310 and a slotted control plate (e.g., a fluid control plate) 312. The slotted plate 312 is disposed between the plenum 310 and the aerodynamic body 302. Further, the example lift increase apparatus 300 also includes a movement device 313, which includes a mount 314 that is coupled to an actuator 316. The example lift increase apparatus 300 also includes a fluid inlet 318, and a fluid source (e.g., an air source) 320.

In operation, as will be discussed in greater detail below in connection with FIGS. 4A-6C, movement of the plate 312 by the actuator 316 relative to the opening 304 causes a jet efflux exiting from the opening 304 to be varied and/or moved (e.g., swept, re-directed, confined or expanded, etc.) across a spanwise direction of the opening 304, as generally indicated by a double arrow 322.

In some examples, the fluid source 320 is an engine bleed line from the engine 107 of the aircraft 100. In some other examples, the fluid source 320 is an Auxiliary Power Unit (APU) of the aircraft 100. In some other examples, the fluid source 320 includes a pump (e.g., an air pump, a liquid pump, a fluid pump, etc.). In some examples, multiple ones of the control plate 312 and the corresponding movement devices 313 are implemented across a span of the opening 304. In some such examples, the movement devices 312 can be operated independently of one another. Additionally or alternatively, motion of the movement devices 312 is coordinated (e.g., moved together, moved out of sync, etc.).

FIGS. 4A-4D illustrate example components of the example lift increase apparatus 300 of FIG. 3. Turning to FIG. 4A, a detailed cutaway view of the aerodynamic body 302 of FIG. 3 is shown. According to the illustrated example, the opening 304 of the external surface 306 is shown extending along a span (e.g., an entire span) of the aerodynamic body 302, which can be any external component, body and/or structure of a vehicle. In some examples, the aerodynamic body 302 at least partially defines an internal cavity of the aircraft 100.

In this example, the opening 304 includes a curved passageway 402 having a first end 404 and a second end 406. The example curved passageway 402 extends along an entire span of the opening 304. In this example, the first end 404 corresponds to a relatively smaller opening of the curved passageway 402 while the second end 406 corresponds to a relatively larger opening of the curved passageway 402. In other words, the curved passageway 402 converges toward the first end 404. However, in other examples, the opening sizes may be identical between the first end 404 and the second end 406. In other examples, the curved passageway 402 may be larger at the first end 404 in comparison to the second end 406. In other examples, the curved passageway 402 is implemented as a converging-diverging duct.

FIG. 4B is a partial cutaway view of the plenum 310. As can be seen in FIG. 4B, the example plenum 310 includes a body 410, which defines a cavity 412, the aforementioned fluid inlet 318, and an opening 414. In this example, the opening 414 extends along a portion of a span of the plenum 310. Further, the opening 414 is in fluid communication with the fluid inlet 318, in this example.

FIG. 4C illustrates the slotted control plate 312. The example slotted control plate 312 includes a slot 420 and an edge 422, which is a straight edge in this example. The example slot 420 is generally angled (e.g., inclined) relative to the edge 422. In particular, the slot 420 of the illustrated example is not parallel or perpendicular with outer edges of the control plate 312.

FIG. 4D illustrates the movement device 313 shown in FIG. 3. As mentioned above in connection with FIG. 3, the movement device 313 includes the mount 314 and the actuator 316, which is implemented as a linear actuator in this example. In some examples, the mount 314 and the actuator 316 are unitary (e.g., integrated). The mount 314 of the illustrated example includes a contact edge 424, a tapered portion 426, and a neck 428 that is coupled to the actuator 316. In this example, the contact edge 424 is to align and couple to the edge 422 of the control plate 312 shown in FIG. 4C.

Figure 5:
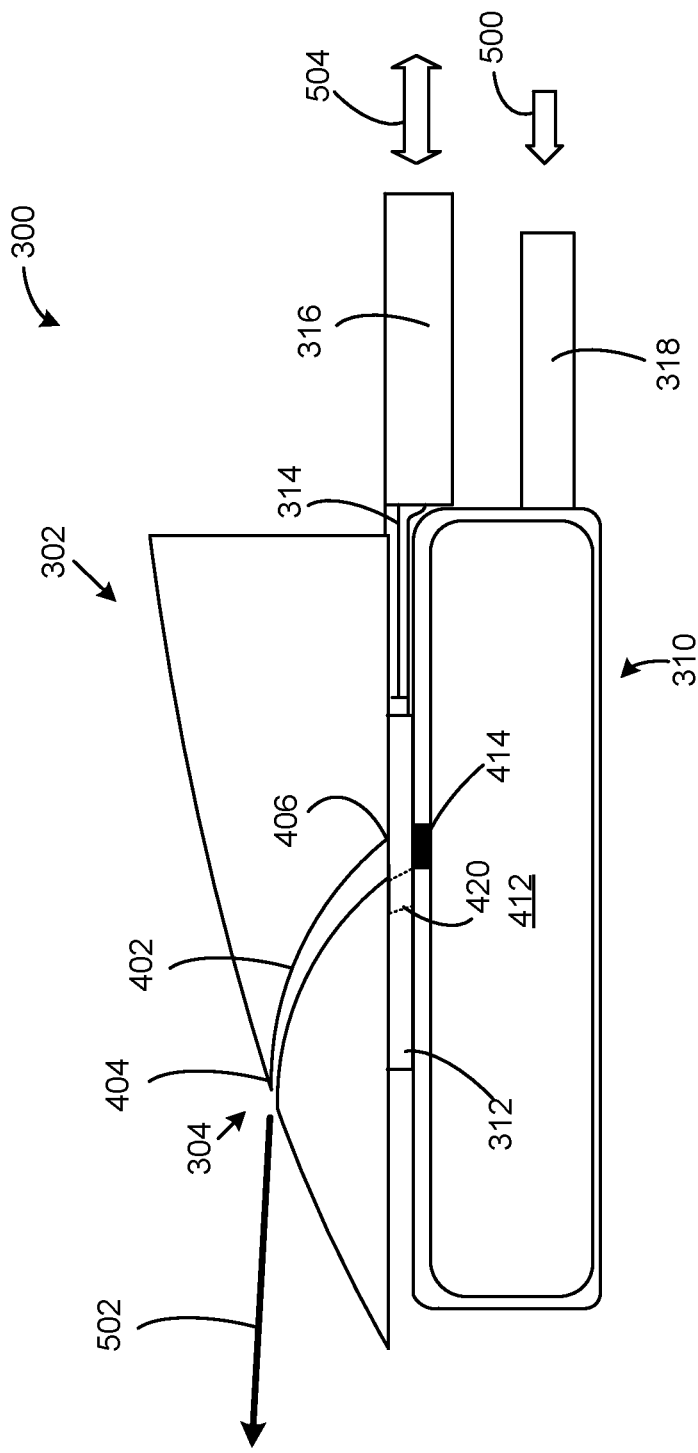
FIG. 5 is a cross-sectional view of the example lift increase apparatus of FIGS. 3-4D.

FIG. 5 is a cross-sectional view of the example lift increase apparatus 300 of FIGS. 3-4D. According to the illustrated example of FIG. 5, the aerodynamic body 302 is shown with the control plate 312, which is operatively coupled to the mount 314 and the actuator 316, and the plenum 310, which includes the fluid inlet 318. In this example, the control plate 312 and at least a portion of the mount 314 is disposed between the aerodynamic body 302 and the plenum 310. In particular, the control plate 312 is disposed between the second end 406 of the curved passageway 402 and the opening 414 of the plenum 310.

To provide fluid (e.g., air, pressurized fluid) to the opening 304, the fluid is provided from the fluid source 320 (shown in FIG. 3) to the fluid inlet 318, as generally indicated by an arrow 500. As a result, the fluid flows into the cavity 412 and out from the opening 414 of the plenum 310. In turn, the fluid flows toward the control plate 312 and through the slot 420. Subsequently, the fluid then flows into the curved passageway 402 and out from the opening 304, as generally indicated by an arrow 502. In this example, the fluid flows from the opening 304 along a streamwise direction of airflow flowing over the wing 104 (e.g., parallel to a direction of flow over the wing 104). However, in other examples, the fluid can exit the opening 304 at an angle relative to the streamwise direction.

According to the illustrated example of FIG. 5, the curved passageway 402 of the opening 304 operates as a nozzle. In particular, the curved passageway 402 acts as a converging nozzle in order to accelerate (e.g., gradually accelerate) the fluid as it flows between the second end 406 and the narrower first end 404. In other examples, a converging-diverging nozzle is implemented instead, to achieve supersonic flow at the first end 404. In yet other examples, no nozzle is implemented.

To define a laterally sweeping and/or shifting movement of the fluid across the opening 304, the actuator 316, which is implemented as a linear actuator in this example, moves the control plate 312 and the slot 420 in an oscillating (e.g., reciprocating) motion, as generally indicated by a double arrow 504. In particular, the slot 420 is angled relative to the direction of motion indicated by the double arrow 504. In other words, the opening 304 extends along a first direction and the slot 420 extends along a second direction different from the first direction and, thus, the slot 420 and the opening 304 are angled relative to one another. Accordingly, moving the slot 420 in a linear motion (e.g., in a linear path) relative to the opening 304 causes a variation in the movement of the fluid out of the opening 304, as is described in greater detail below in connection with FIGS. 6A-6F. The variation may entail a lateral movement, a directional change, a change in width, and/or a change in number of jet effluxes of the fluid.

In some examples, the plenum 310 is disposed within a cavity (e.g., an internal volume, an internal cavity, etc.) of the aerodynamic body 302. In some examples, a cam or gearing is implemented (e.g., in conjunction with the actuator 316) to provide the oscillatory motion of the control plate 312. In other examples, the actuator 316 moves the control plate 312 in a swaying motion (e.g., into and out of the view of FIG. 5). In some examples, the opening 304 does not include the curved passageway 402 or a nozzle. In some examples, the actuator 316 moves the control plate 312 with a non-uniform motion. In some other examples, a nozzle (e.g., a diverging nozzle, a diverging-converging, nozzle, etc.) is coupled and/or assembled to the opening 304. In other examples, the control plate 312 is disposed within the plenum 310 (e.g., the control plate is caused to move within the plenum 310).

FIGS. 6A-6F illustrate operation of the example lift increase apparatus 300 of FIGS. 3-5. In particular, FIGS. 6A-6F depict different example time steps during operation of the example lift increase apparatus 300. For each timestep depicted in the FIGS. 6A-6F, corresponding perspective and cutaway cross-sectional views (viewed from the bottom of the lift increase apparatus 300) are shown. Turning to FIGS. 6A and 6B, a first time step is shown in which the control plate 312 is moved to an extreme left (in the view of FIG. 6B) based on the oscillatory motion of the control plate 312 driven by the actuator 316. In this example, a dotted line 602 represents a footprint and/or relative placement the opening 304 and/or the curved passageway 402 with the slot 420. In particular, an overlap of the slot 420 with the line 602 corresponds to where a jet efflux 604 exits from the opening 304. As a result, the jet efflux 604 is shown in a first position along a span of the opening 304.

FIGS. 6C and 6D depict a second intermediate time step. In the illustrated example, the control plate 312 has been moved from the position shown in FIGS. 6A and 6B to an intermediate position (e.g., a position between movement extremes). In particular, the slot 420 has moved relative to the line 602, thereby causing the jet efflux 604 to further travel along the span of the opening 304 from the position shown in FIG. 6A.

Turning to FIGS. 6E and 6F, a third time step is shown in which the control plate 312 is moved to its extreme right-most displacement (in the view of FIG. 6F) corresponding to the oscillatory movement of the control plate 312. Accordingly, the jet efflux 604 is moved to a different position along the opening 304 from those shown in FIGS. 6A and 6C. Accordingly, in this example, the jet efflux 604 has moved to an opposite lateral portion of the span of the opening 304 from that shown in FIG. 6A.

In some examples, the control plate 312 is moved at approximately 5 to 15 Hertz (Hz) (e.g., 10 Hz). However, the frequency can range at different values dependent on application and flight conditions. Additionally or alternatively, the control plate 312 is moved laterally (i.e., upward and downward in the view of FIGS. 6A-6C), as generally indicated by a double arrow 606. Additionally or alternatively, the control plate 312 is swept in an arc, as generally indicated by a double arrow 608. In some such examples, the 420 may be arc-shaped instead of a straight slot.

FIGS. 7A and 7B illustrate an example alternative lift increase apparatus 700 with an example control plate 701. In particular, FIG. 7A depicts a perspective view of the lift increase apparatus 700 while FIG. 7B depicts the lift increase apparatus 700 in cross-sectional view. The control plate 701 is similar to the control plate 312 described above in connection with FIGS. 3-6F, but includes multiple angled slots 702 instead of the single slot 420. In this example, the slots 702 are arranged parallel and equidistant to one another. However, in other examples, the slots 702 could be spaced at different distances or angled relative to one another. Accordingly, regions 704 indicate overlap of the slots 702 with the line 602, by which jet effluxes are formed. Accordingly, an example resultant flow path of fluid from the slotted plate 701 is shown as resultant effluxes 712. In this example, three of the effluxes 712 are formed based on the three corresponding overlap regions 704.

While three of the slots 702 are described in this example, any appropriate number of slots (e.g., two, four, five, ten, twenty, one hundred, etc.) can be implemented instead. Further, while the slots 702 are shown spanning across most of a width the control plate 701, in some examples, at least one of the slots 702 only partially spans the width of the control plate 701 (e.g., 20%, 30% or 50% of the width of the control plate 701, etc.).

FIGS. 8A-8D illustrate another alternative lift increase apparatus 800 with an example control plate 801 that can be implemented in examples disclosed herein. FIGS. 8A-8D depict movement of the control plate 801 at two different time steps. Turning to FIGS. 8A and 8B, the lift increase apparatus 800 is depicted at a first time step. the control plate 801 includes slots 802 with a distinct slot geometry from the control plate 701. In particular, the slots 802 are angled at a relatively greater angle in relation to the direction of motion of the control plate 801 such that the slots 802 do not generally span a lateral width of the control plate 801, which is different from the slots 702. In the illustrated example, three jet effluxes 810 are shown exiting the opening 304. In contrast to the jet effluxes 712 shown in FIG. 7B, the jet effluxes 810 are spaced relatively closer to one another.

FIGS. 8C and 8D depict a second time step of the lift increase apparatus 800. In the illustrated example, the control plate 801 along with the slots 802, which are spaced evenly in this example, are moved and, thus, the jet effluxes 810 maintain the same spacing to that shown in FIG. 8A, but are moved laterally along a span of the opening 304 instead.

FIGS. 9A-9F illustrate yet another alternative example lift increase apparatus 900, which includes a slotted control plate 902. In particular, FIGS. 9A-9F depict corresponding perspective and cross-sectional views corresponding to three different time steps pertaining to movement of the control plate 902.

Figure 9E:
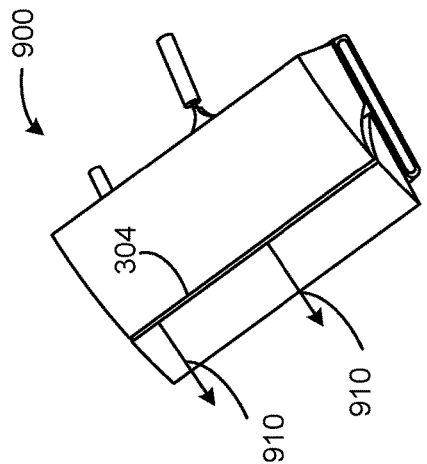
FIGS. 9A-9F illustrate yet another alternative example lift increase apparatus that can be implemented in examples disclosed herein.
Figure 9F:
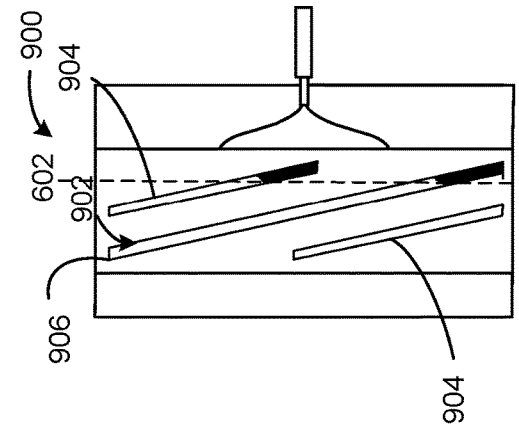
Figure 9C:
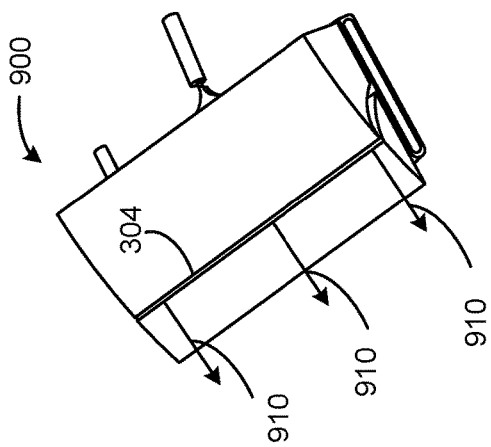
Figure 9D:
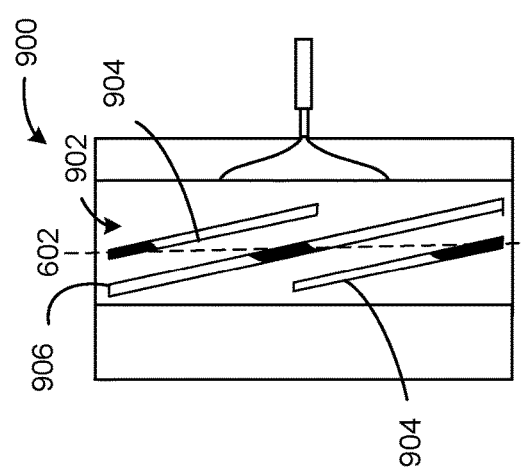
Figure 9A:
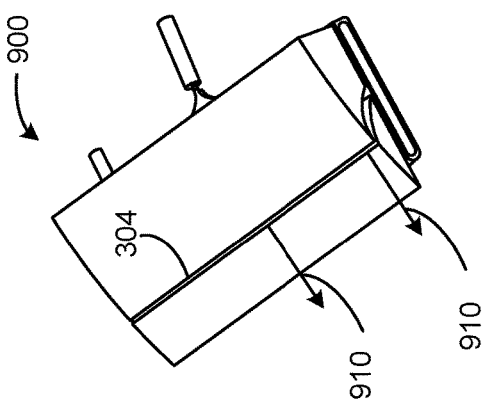
Figure 9B:
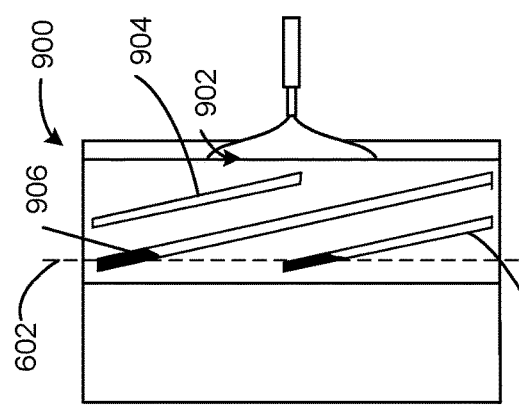

FIGS. 9A and 9B depict the example control plate 902 at a first time step. In this example, the control plate 902 includes shorter slots 904 and a longer slot 906 disposed between the shorter slots 904. In particular, the slots 904 are relatively shorter (e.g., 30 to 60% shorter) than the slot 906. In the illustrated example, the first time step corresponds to only two jet effluxes 910 exiting the opening 304. In particular, one of the slots 904 does not intersect with the line 602 at the first time step.

Turning to FIGS. 9C and 9D, which depict a second time step corresponding to movement of the control plate 902, all of the slots 904, 906 intersect with the line 602, thereby causing three of the effluxes 910 to exit the opening 304. In this example, the three effluxes 910 are spaced generally uniform from one another (e.g., equidistant).

FIGS. 9E and 9F depict the control plate 902 at a third time step. Similar to the first time step of FIGS. 9A and 9B, one of the slots 904 does not intersect with the line 602 and, thus, two of the effluxes 910 exit the opening 304 instead of 3. In contrast to the first time step depicted in FIGS. 9A and 9B, however, the two effluxes 910 exit the opening 304 at a different side of the opening 304. In this particular example, the number of the effluxes 910 varies during an oscillatory cycle.

From the foregoing, it will be appreciated that example methods, apparatus and articles of manufacture have been disclosed that enable a cost-effective manner of increasing lift and reducing drag on an aerodynamic body. Accordingly, aircraft drag and corresponding fuel costs may be reduced. Further, examples disclosed herein enable a flow control system that results in a net benefit to vehicle performance.

Example 1 includes an apparatus having a flow control plate to be placed proximate an opening of an aerodynamic body. The opening has a first slot and the flow control plate has a second slot angled relative to the opening. The apparatus also has an actuator to move the flow control plate relative to the opening in a linear oscillatory motion to vary a flow of fluid exiting the opening. The flow of fluid is to flow from the second slot to the first slot.

Example 2 includes the apparatus of Example 1, where the opening includes a curved passageway extending between the first and second slots.

Example 3 includes the apparatus of Example 1, where the curved passageway defines a converging nozzle for the fluid flow as the fluid flows from the second slot to the first slot.

Example 4 includes the apparatus of Example 1, and further includes a plenum operatively coupled between a fluid source and the flow control plate.

Example 5 includes the apparatus of Example 4, where the plenum includes a third slot proximate the second slot to provide the flow of fluid to the second slot.

Example 6 includes the apparatus of Example 1, where the aerodynamic body includes a flap, a flaperon or an aileron.

Example 7 includes the apparatus of Example 1, where the actuator is a linear actuator to cause a linear motion of the flow control plate relative to the opening.

Example 8 includes the apparatus of Example 1, where the fluid includes air, and wherein a fluid source of the air includes a bleed line of an engine or an air pump.

Example 9 includes a method including providing, via a fluid source, a fluid flow to a flow control plate that is proximate an opening of an aerodynamic body, where the opening includes a first slot, and where the flow control plate includes a second slot in fluid communication with the first slot and angled from the first slot. The method also includes moving, via an actuator, the flow control plate in a linear oscillatory motion relative to the opening to vary a flow of fluid from a fluid source exiting the opening.

Example 10 includes the method of Example 9, and further includes providing the fluid flow from the fluid source to a plenum positioned proximate the flow control plate, where the plenum has an outlet in fluid communication with the flow control plate.

Example 11 includes the method of Example 10, where the flow control plate is moved within the plenum.

Example 12 includes the method of Example 9, where the flow control plate is moved along a linear path during the linear oscillatory motion.

Example 13 includes the method of Example 9, where the flow control plate is moved in a sweeping motion.

Example 14 includes the method of Example 9, where the opening includes a converging nozzle or a converging-diverging nozzle.

Example 15 includes the method of Example 9, where moving the flow control plate in the linear oscillatory motion includes a non-uniform movement of the flow control plate.

Example 16 includes an aircraft having an aerodynamic body having an opening thereon, where the opening includes a first slot. The aircraft also includes a flow control plate positioned proximate the first slot, the flow control plate having a second slot in fluid communication with the first slot, the second slot angled relative to the first slot, and an actuator to move the flow control plate in a linear oscillatory motion to vary a flow of fluid from a fluid source exiting the first slot.

Example 17 includes the aircraft of Example 16, where the aerodynamic body includes a flap, a flaperon or an aileron of the aircraft.

Example 18 includes the aircraft of Example 16, where the aerodynamic body includes a wing of the aircraft.

Example 19 includes the aircraft of Example 16, where the opening defines a converging nozzle or a converging-diverging nozzle.

Example 20 includes the aircraft of Example 16, where the aerodynamic body defines an external surface of the aircraft and a cavity in which the flow control plate is disposed.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown in the context of aircraft, examples disclosed herein can be implemented in conjunction with any appropriate aerodynamic application included, but not limited to, ground-based vehicles, boats, submarines, unmanned aerial vehicles, etc.

The following claims are hereby incorporated into this Detailed Description by this reference, with each claim standing on its own as a separate embodiment of the present disclosure.

What is claimed is:

1. An apparatus comprising:
   a flow control plate to be placed proximate an opening of an aerodynamic body, the opening having a first slot, the flow control plate having a second slot angled relative to the opening; and
   an actuator to move the flow control plate relative to the opening in a linear oscillatory motion by moving the second slot along a lateral direction of an exterior surface of the aerodynamic body to vary a flow of fluid exiting the opening, the flow of fluid to flow from the second slot to the first slot.

2. The apparatus as defined in claim 1, wherein the opening includes a curved passageway extending between the first and second slots.

3. The apparatus as defined in claim 2, wherein the curved passageway defines a converging nozzle for the fluid flow as the fluid flows from the second slot to the first slot.

4. The apparatus as defined in claim 1, further including a plenum operatively coupled between a fluid source and the flow control plate.

5. The apparatus as defined in claim 4, wherein the plenum includes a third slot proximate the second slot to provide the flow of fluid to the second slot.

6. The apparatus as defined in claim 1, wherein the aerodynamic body includes a flap, a flaperon or an aileron.

7. The apparatus as defined in claim 1, wherein the actuator is a linear actuator to cause a linear motion of the flow control plate relative to the opening.

8. The apparatus as defined in claim 1, wherein the fluid includes air, and wherein a fluid source of the air includes a bleed line of an engine or an air pump.

9. A method comprising:
   providing, via a fluid source, a fluid flow to a flow control plate that is proximate an opening of an aerodynamic body, the opening including a first slot, the flow control plate including a second slot in fluid communication with the first slot and angled from the first slot; and
   moving, via an actuator, the flow control plate in a linear oscillatory motion relative to the opening by moving the second slot along a lateral direction of an exterior surface of the aerodynamic body to vary a flow of fluid from a fluid source exiting the opening.

10. The method as defined in claim 9, further including providing the fluid flow from the fluid source to a plenum positioned proximate the flow control plate, the plenum having an outlet in fluid communication with the flow control plate.

11. The method as defined in claim 10, wherein the flow control plate is moved within the plenum.

12. The method as defined in claim 9, wherein the flow control plate is moved along a linear path during the linear oscillatory motion.

13. The method as defined in claim 9, wherein the flow control plate is moved in a sweeping motion.

14. The method as defined in claim 9, wherein the opening includes a converging nozzle or a converging-diverging nozzle.

15. The method as defined in claim 9, wherein moving the flow control plate in the linear oscillatory motion includes a non-uniform movement of the flow control plate as a function of time.

16. An aircraft comprising:
   an aerodynamic body having an opening thereon, the opening including a first slot;
   a flow control plate positioned proximate the first slot, the flow control plate having a second slot in fluid communication with the first slot, the second slot angled relative to the first slot; and
   an actuator to move the flow control plate in a linear oscillatory motion by moving the second slot along a lateral direction of an exterior surface of the aerodynamic body to vary a flow of fluid from a fluid source exiting the first slot.

17. The aircraft as defined in claim 16, wherein the aerodynamic body includes a flap, a flaperon or an aileron of the aircraft.

18. The aircraft as defined in claim 16, wherein the aerodynamic body includes a wing of the aircraft.

19. The aircraft as defined in claim 16, wherein the opening defines a converging nozzle or a converging-diverging nozzle.

20. The aircraft as defined in claim 16, wherein the aerodynamic body defines an external surface of the aircraft and a cavity in which the flow control plate is disposed.

21. The apparatus as defined in claim 1, wherein the first slot extends across a first plane and the second slot extends across a second plane that is parallel to the first plane.

* * * * *